US011874887B2

(12) United States Patent
Duleba et al.

(10) Patent No.: US 11,874,887 B2
(45) Date of Patent: Jan. 16, 2024

(54) PROTOCOL BASED COMPUTER NETWORK CONTENT TRANSMISSION BASED ON CLIENT COMPUTING DEVICE PARAMETERS

(71) Applicant: GOOGLE LLC, Mountain View, CA (US)

(72) Inventors: Krzystof Duleba, Zurich (CH); Amin Charaniya, Santa Clara, CA (US); Vibhor Nanavati, Santa Clara, CA (US); Aileen Tang, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 17/539,190

(22) Filed: Nov. 30, 2021

(65) Prior Publication Data

US 2022/0092139 A1 Mar. 24, 2022

Related U.S. Application Data

(63) Continuation of application No. 16/298,216, filed on Mar. 11, 2019, now Pat. No. 11,188,602, which is a continuation of application No. 15/378,731, filed on Dec. 14, 2016, now Pat. No. 10,229,213, which is a continuation of application No. 13/759,721, filed on Feb. 5, 2013, now abandoned.

(51) Int. Cl.

*G06F 16/00* (2019.01)
*G06F 16/9535* (2019.01)

(Continued)

(52) U.S. Cl.

CPC .......... *G06F 16/9535* (2019.01); *G06F 16/29* (2019.01); *G06F 16/9038* (2019.01);

(Continued)

(58) Field of Classification Search

CPC .. G06F 16/9535; G06F 16/29; G06F 16/9038; G06F 16/9537; H04L 67/01; H04L 67/303; H04L 67/52

See application file for complete search history.

(56) References Cited

U.S. PATENT DOCUMENTS 8,086,690 B1 * 12/2011 Heymans ........... G06Q 30/0261 709/217

8,230,087 B2 * 7/2012 Alve ....................... G06F 21/10 455/411

(Continued)

*Primary Examiner* — Jared M Bibbee

(74) *Attorney, Agent, or Firm* — MARSHALL, GERSTEIN & BORUN LLP

(57) ABSTRACT

A content management system server can obtain a protocol based data transmission via a computer network from a script that executes at the publisher device server, and can obtain search result content items from an index of electronic documents that include snippets of text extracted from the search result content items and that include hypertext links to the search result content items. The system can extract feature vectors and document identifiers of the search result content items, and can determine information retrieval scores of search result content items. Based on the network identifier, location probabilities of device locations can be ranked and compared to thresholds. The system can determine a confidence threshold representing a minimum degree of certainty of the geographical location of the devices and can select content for protocol based transmission accordingly.

19 Claims, 8 Drawing Sheets

100

Content Management System
104

Content Provider Devices
102

Network
110

Publisher Devices
106

User Devices
108

(51) Int. Cl.

| | |
|---|---|
| ***G06F 16/29*** | (2019.01) |
| ***G06F 16/9038*** | (2019.01) |
| ***H04L 67/303*** | (2022.01) |
| ***G06F 16/9537*** | (2019.01) |
| ***H04L 67/01*** | (2022.01) |
| ***H04L 67/52*** | (2022.01) |

(52) U.S. Cl.
CPC .......... *G06F 16/9537* (2019.01); *H04L 67/01* (2022.05); *H04L 67/303* (2013.01); *H04L 67/52* (2022.05)

(56) References Cited

U.S. PATENT DOCUMENTS

| | | | | |
|---|---|---|---|---|
| 8,719,081 | B1 * | 5/2014 | Langrock | G06Q 30/0275 705/14.1 |
| 9,514,220 | B1 * | 12/2016 | Wright | G06F 16/3337 |
| 2005/0060430 | A1 * | 3/2005 | Riise | H04L 67/52 707/E17.11 |
| 2005/0108213 | A1 * | 5/2005 | Riise | G06F 16/9537 |
| 2008/0167943 | A1 * | 7/2008 | O'Neil | G06Q 30/08 705/7.29 |
| 2010/0036710 | A1 * | 2/2010 | Ames | G06Q 10/0875 705/29 |
| 2011/0077026 | A1 * | 3/2011 | Cousins | H04W 4/50 455/456.2 |
| 2011/0137895 | A1 * | 6/2011 | Petrou | G06F 16/242 707/723 |
| 2012/0134590 | A1 * | 5/2012 | Petrou | G06V 30/262 382/182 |
| 2012/0150626 | A1 * | 6/2012 | Zhang | G06Q 30/0241 705/14.42 |
| 2013/0071090 | A1 * | 3/2013 | Berkowitz | H04N 21/435 386/248 |
| 2013/0218665 | A1 * | 8/2013 | Abbott | G06Q 30/08 705/14.43 |
| 2013/0218679 | A1 * | 8/2013 | Wu | G06Q 30/0242 705/14.58 |

* cited by examiner

210

Come see a
Broadway Show!

Take the LIRR to
Come see a
Broadway Show!

FIG. 5B

| | Click Through Rate (Content Item 210) |
|---|---|
| Connecticut | 25% |
| New Jersey | 20% |
| New York | 12% |
| Long Island | 10% |

PROTOCOL BASED COMPUTER NETWORK CONTENT TRANSMISSION BASED ON CLIENT COMPUTING DEVICE PARAMETERS

CROSS-REFERENCE TO RELATED APPLICATION

The present application claims the benefit of priority under 35 U.S.C. § 120 as a continuation of U.S. patent application Ser. No. 16/298,216, filed Mar. 11, 2019, which claims the benefit of priority under 35 U.S.C. § 120 as a continuation of U.S. patent application Ser. No. 15/378,731, filed Dec. 14, 2016, which claims the benefit of priority as a continuation of U.S. patent application Ser. No. 13/759,721, filed Feb. 5, 2013. Each of the foregoing applications are herein incorporated by reference in their entirety for all purposes.

BACKGROUND

The present disclosure relates to content presentation.

Content providers provide content in different forms in order to attract consumers. Such content is designed to be used in whole or part by a user, for example, a particular consumer. Additionally, such content can be provided in electronic form. For example, such content can be provided on a web page, together with search results, or within a mobile application.

SUMMARY

This specification describes technologies relating to content presentation.

In general, one aspect of the subject matter described in this specification can be embodied in methods for providing third party content. The method includes the actions of receiving, in association with a content request, a network identifier, the network identifier corresponding to a network location of a device from which the content request originated, processing, with one or more processors, the network identifier to determine one or more probabilities, each of the probabilities reflecting a likelihood that the network location corresponds to a respective geographic location, ranking each of the one or more probabilities relative to one another, comparing the one or more probabilities with one or more probability rank thresholds, each of the one or more probability rank thresholds being associated with one or more content items, selecting, based on the comparison of the one or more probabilities with the one or more probability rank thresholds, at least one of the one or more content items, and providing the at least one of the one or more content items to the device.

The details of one or more implementations are set forth in the accompanying drawings and the description below. Other features and advantages will be apparent from the description and drawings, and from the claims.

BRIEF DESCRIPTION OF THE DRAWINGS

FIG. 4 depicts an exemplary IP address from which a content request originates.

FIG. 5A depicts an exemplary text content item.

FIG. 5B depicts an exemplary adjusted text content item.

FIG. 6 depicts exemplary click through rates for a content item with respect to their respective geographic locations.

Like reference symbols in the various drawings indicate like elements.

DETAILED DESCRIPTION

By way of overview and introduction, it can be advantageous for content providers, such as advertisers, to deliver content that is directed towards one or more geographic locations. In various content delivery systems, the geographic location from which a content request (such as an ad request from a website or 'app') originates is determined based on the IP address of the requesting device using various IP geolocation techniques as are known to those of ordinary skill in the art. However, in many circumstances such techniques cannot determine with absolute certainty the geographic location from which the content request originated. Rather, these techniques provide several possible geographic locations together with respective degrees of likelihood that the content request originated from such a location. As such, it can be advantageous for content providers to configure various aspects of their content delivery operations to account for this inherent lack of certainty. For example, certain content providers may wish to broaden the geographic area with respect to which their content items are eligible for delivery while other content providers may wish to direct their content items only to a narrow/focused geographic area. Accordingly, described herein in various implementations are various methods that enable the delivery of geographically directed content in response to content requests determined to have originated from any number of possible locations.

While reference will be made below to advertising systems and processes, other forms of content including other forms of sponsored content can be managed and presented in accordance with the description below.

Figure 1:
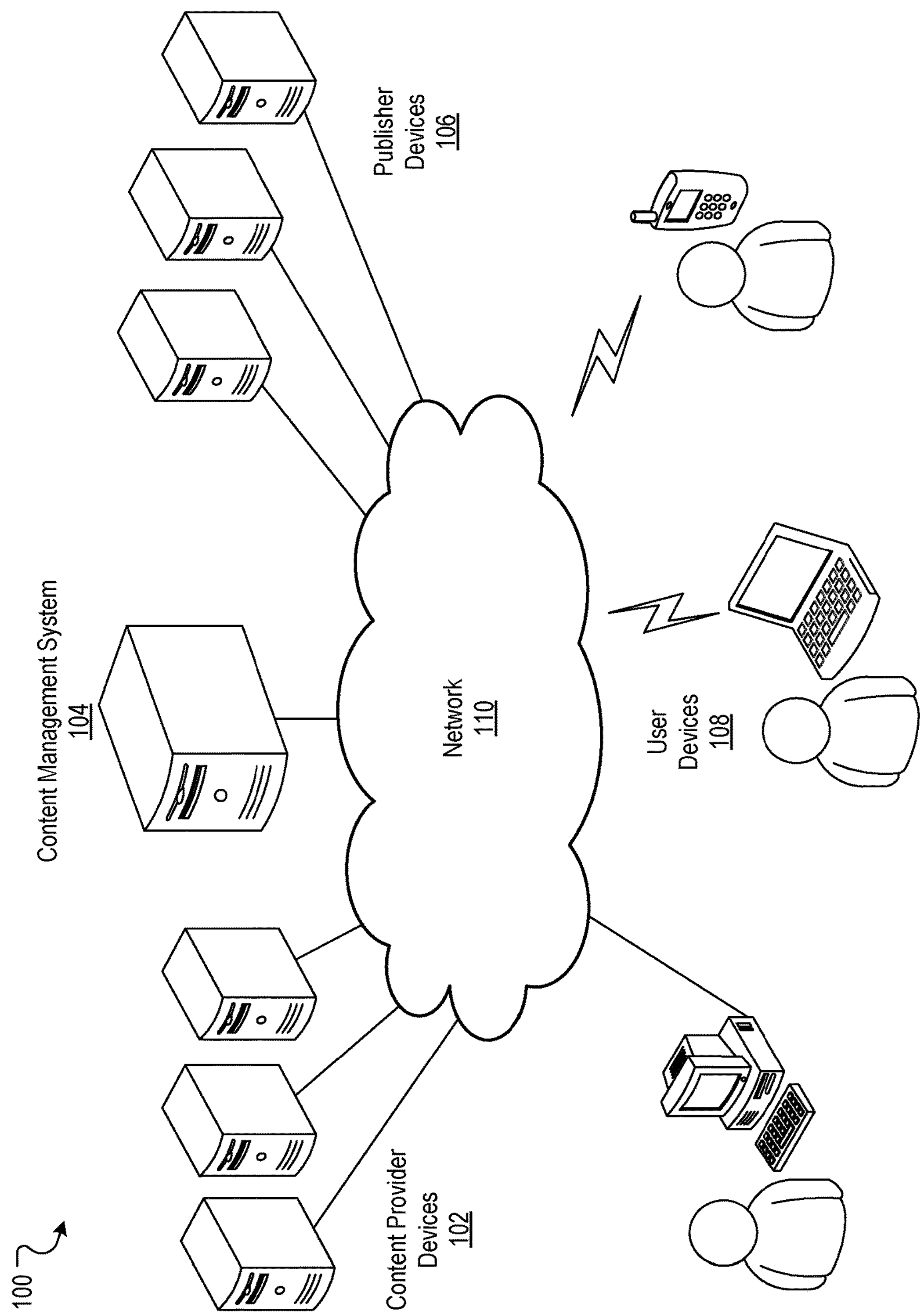
FIG. 1 is a diagram of an example content presentation system.

FIG. 1 is a block diagram showing an example content presentation system 100. In some implementations, one or more third party content providers such as advertisers, using content provider devices 102, can directly, or indirectly, enter, maintain, and log third party content information such as ad information in a content management system such as system 104. Though reference is made to advertising, other forms of content, including other forms of sponsored content, can be delivered by the system 100. The ads can be in the form of graphical ads, such as banner ads, text-only ads, image ads, audio ads, video ads, media ads, interactive ads, ads combining one or more of any of such components, etc. The ads can also include embedded information, such as links, meta-information, and/or machine executable instructions.

One or more first party content providers such as publishers, using publisher devices 106, can submit requests for third party content items such as ads to the system 104. The system 104 responds by sending third party content items to the requesting publisher device 106 for placement on, or association with, one or more of the publisher's content items (e.g., web properties such as web pages). It should also be understood that in certain implementations, third party content items such as ads can be provided in a substantially similar manner in television and radio content slots (such as advertising slots), and/or print media space.

Other entities, such as users, using user devices 108, and third party content providers such as the advertisers, using content provider devices 102, can provide usage information to the system 104, such as, for example, whether or not a conversion (e.g., a purchase or other interaction including, for example, a request for driving directions to a location associated with a third party content item such as an ad, navigating to the location associated with a third party content item such as the ad, or walking to the location associated with a third party content item such as the ad) or a click-through related to a third party content item such as an ad (e.g., a user has selected a third party content item such as an ad) has occurred. This usage information can include measured or observed user behavior related to third party content items such as ads that have been served. It should be noted that in situations where personal or identifying information is collected, users may be provided with the ability to control whether such information is collected, the extent to which such information is collected, and/or the extent to which a user can be identified based on it. For example, a user can select an option whereby any personal or identifying information is immediately aggregated with that of other users such that such information cannot subsequently be associated with or otherwise identify the individual user. The system 104 can perform financial transactions, for example, crediting first party content providers such as the publishers 106 and charging third party content providers such as the advertisers 102 based on the usage information.

A network 110, such as a local area network (LAN), wide area network (WAN), the Internet, one or more telephony networks or a combination thereof, connects content provider devices 102, the system 104, publisher devices 106, and user devices 108.

One example publisher device 106 is a general content server that receives requests for first party content (e.g., articles, discussion threads, music, video, graphics, search results, web page listings, information feeds, etc.), and retrieves the requested first party content in response to the request. The content server can submit a request for third party content such as ads to a content server such as an advertisement server in the system 104. The third party content item request can include a number of third party content items such as ads desired. The third party content item request can also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server or a client browser can combine the requested first party content with one or more of the third party content items such as ads provided by the system 104. The combined first party content and third party content items such as ads can be sent/rendered to the user devices 108 that requested the content for presentation in a viewer (e.g., a browser or other content display system). The content server can transmit information about the third party content items such as ads back to the content server, including information describing how, when, and/or where the third party content items such as ads are to be rendered (e.g., in HTML or JavaScript™).

Another example publisher device 106 is a server that provides a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and can be grouped into a predetermined number of (e.g., ten) search results.

The search service can submit a request for third party content items such as ads to the system 104. The request can include a number of third party content items desired. This number can depend on the search results, the amount of screen or page space occupied by the search results, the size and shape of the third party content items, and/or a variety of other factors. In some implementations, the number of desired third party content items will be from one to ten, or from three to five. The request for third party content items can also include the query (as entered or parsed), information based on the query (such as geo-location information, whether the query came from an affiliate and an identifier of such an affiliate), and/or information associated with, or based on, the search results. Such information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

In some implementations, the content management system 104 includes an auction process to select third party content items such as ads from the third party content providers such as advertisers. For example, third party content providers such as the advertisers can be permitted to select, or bid, an amount they are willing to pay for each presentation of or interaction with (e.g., click of) a third party content item, e.g., a cost-per-click amount a third party content provider pays when, for example, a user clicks on a third party content item. The cost-per-click can include a maximum cost-per-click, e.g., the maximum amount the third party content provider is willing to pay for each click of an third party content item based on a keyword, e.g., a word or words in a query. Other bid types, however, can also be used. Based on these bids, third party content items can be selected and ranked for presentation.

The search service can combine the search results with one or more of the third party content items provided by the system 104. This combined information can then be forwarded to the user devices 108 that requested the content. The search results can be maintained as distinct from the third party content items, so as not to confuse the user between paid third party content items and presumably neutral search results.

In some implementations, one or more publisher devices 106 can submit requests for third party content items such as ads to a content management system such as content management system 104. The system 104 responds by sending third party content items to the publisher device 106 for placement on one or more of the publisher's web properties (e.g., websites and other network-distributed content) that are relevant to the web property. For example, if a publisher device 106 publishes a sports-related web site, the content management system can provide sports-related ads to the publisher device 106. In some implementations, the requests can instead be executed by devices associated with the user 108, e.g., by the execution of a particular script when the publisher's web page is loading on a client device.

In some alternative implementations, an ad push model is used to provide third party content items such as ads from third party content providers such as advertisers. In an ad push model, ads can be pushed to idle screens (e.g., of a mobile devices or particular applications) based on particular criteria (e.g., the user's location).

In another example the referenced publisher can be a mobile application developer. A mobile application is an application specifically designed for operation on a mobile device (e.g., a smart phone). The mobile application can also include ads positioned within the content of the mobile application. Similar to publishers, the ads can be received from the system 104 for placement in the mobile application when accessed by a user device (e.g., when a particular page of a mobile application is loaded on the mobile device).

For situations in which the systems discussed here collect personal information about users, the users may be provided with an opportunity to control the manner such information is collected with respect to programs or features that may collect personal information (e.g., information about a user's preferences or a user's current location). Users may also be informed of the accompanying limitations on the functionality of a service that may result from limiting access to such personal information. In addition, certain data may be anonymized in one or more ways before it is stored or used, so that personally identifiable information is removed. For example, a device identifier associated with a user's identity may be anonymized so that no personally identifiable information can be determined for the user, or a user's geographic location may be generalized where location information is obtained (such as to a city, zip code, or state level), so that a particular location of a user cannot be determined.

Figure 2:
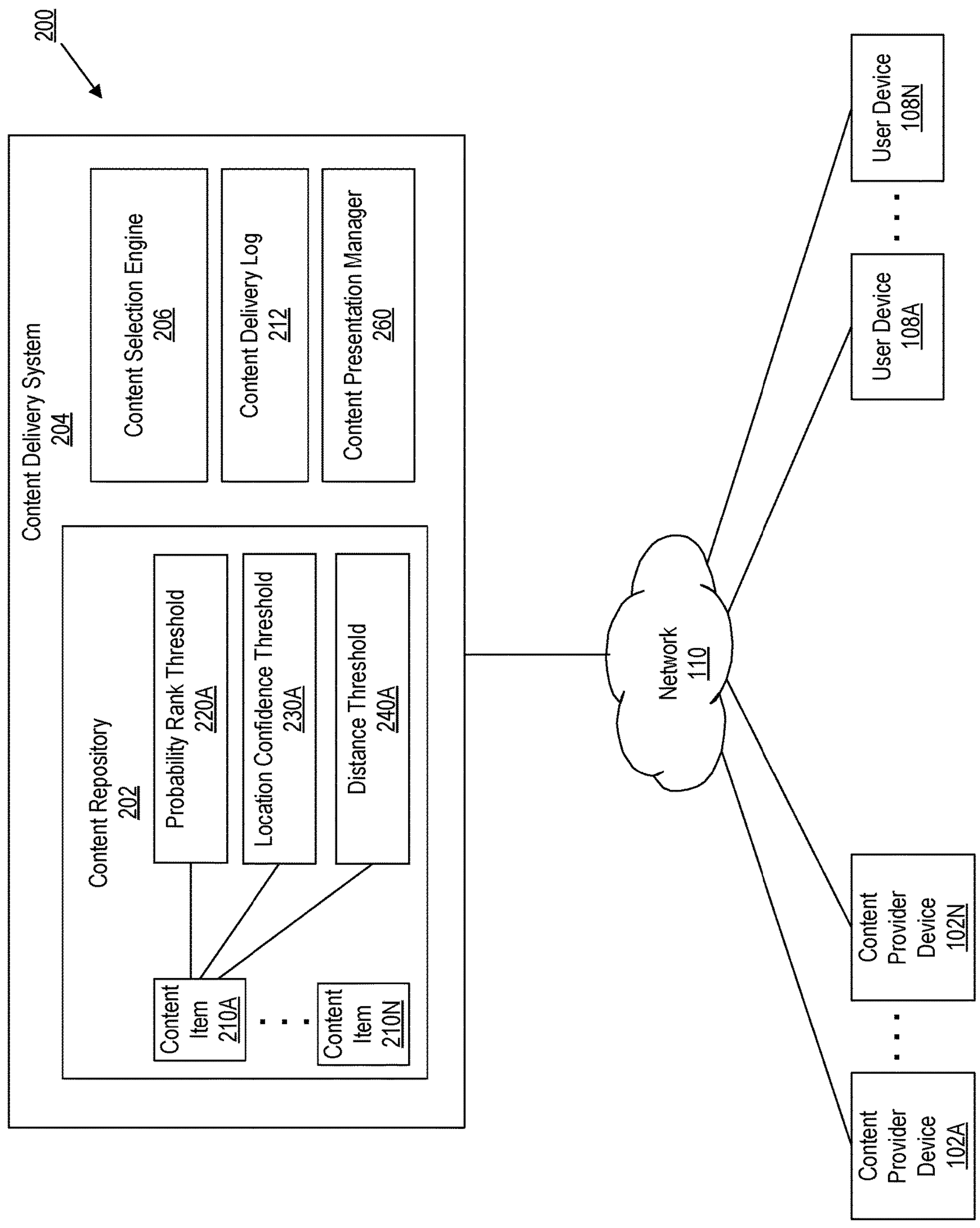
FIG. 2 is a block diagram of an example system for providing third party content.

FIG. 2 is a block diagram of an example system 200 for providing third party content. In the system 200, a third party content provider such as advertiser, using content provider devices 102A-102N (referred to collectively as content provider devices 102) can submit one or more third party content items 210A-210N such as ads (also known as "creatives") (referred to collectively as content items 210) to a content delivery system 204, and such content items 210 are stored in a third party content repository such as an content repository 202. Each content item (e.g., content item 210A) includes one or more words, phrases, web links, and/or any other such element and/or component (e.g., images, video, audio, etc.) that are provided to one or more user devices 108 (e.g., banner ads, text-only ads, image ads, audio ads, video ads, etc.). In certain implementations, one or more keywords (not shown) are associated with one or more creatives in order to enable the identification and selection of pertinent content items for display to a user based on one or more search queries received from the user. It should also be noted that although content items 210 are described herein as referring to individual content items, in certain implementations content items 210 can refer to groups of content items, such as ad groups, campaigns, and/or categories.

One or more of the third party content items, such as content items 210, can be associated with one or more probability rank thresholds 220. As described and illustrated herein, such probability rank thresholds can dictate the degree of certainty or likelihood with respect to a particular geographic location that must be met in order for a particular content item to be provided in response to a particular content request. That is, a content provider (e.g., an advertiser) can designate a particular geographic location (e.g., a city, state, metropolitan area, zip code, etc.) with respect to which a content item is to be directed, and an associated probability rank threshold can further dictate the degree of certainty or likelihood that must be determined with respect to a particular content request in order for the content item to be provided (or be eligible to be provided) in response. As described and illustrated herein, by implementing different probability rank thresholds, a content provider can dictate that a content item be provided to a relatively broad range of locations (such as by implementing a probability rank threshold that requires a relatively low probability that a content request has originated from the primary geographic location designated with respect to the content item) and/or that a content item be provided to a relatively narrow/focused range of locations (such as by implementing a probability rank threshold that requires a relatively high probability that a content request has originated from the primary geographic location designated with respect to the content item).

One or more of the third party content items, such as content items 210, can also be associated with one or more location confidence thresholds 230. As described and illustrated herein, such location confidence thresholds can dictate a minimum degree of likelihood that must be met with respect to a determination that a content request originated from a particular geographic location in order for content items designated for delivery with respect to such a location to be eligible for delivery in response to such a content request. Implementing such a location confidence threshold can serve to prevent the delivery of content items in response to content requests that are highly unlikely to actually have originated from the geographic location with respect to which such content items are principally designated.

One or more of the third party content items, such as content items 210, can also be associated with one or more distance thresholds 240. As described and illustrated herein, such distance thresholds can dictate that an associated content item only be provided in response to a content request determined to be relatively most likely to have originated from a geographic location that is within a defined distance/radius from the geographic location with respect to which the content item is principally designated. Such distance thresholds can enable a content provider to both provide content items to a broader range of locations while also ensuring that such content items are not provided in response to content requests having a substantial likelihood of originating from far outside the geographic location with respect to which such content items are principally designated.

Content delivery system 204 can also include a content presentation manager 260. The content presentation manager 260 can identify content items, such as ads, in the content repository 202 to present at a user device 108, for example based on various criteria such as keywords in a search query, web page content, context, location, ad financials (e.g., cost per impression). For example, content presentation manager 260 can identify one or more content items 210 associated with one or more keywords that are similar and/or identical to the search query provided by the user, and such creatives can be provided to the user in any number of ad formats. It should be understood that in some implementations, the content delivery system 204 can interact with a search system, for example presenting content items, such as ads, alongside search results. In some implementations, the content delivery system 204 can interact with content publishers, for example, providing content items, such as ads, to publishers or users for presentation along with web content, e-mail, or other content.

Content delivery system 204 can also include one or more content delivery logs 212. In certain implementations, content delivery log 212 can maintain content item display histories, which maintains a record of the various instances of the display of respective content items, such as ads, to respective users. Moreover, in certain implementations content delivery log 212 can maintain a record of one or more content delivery performance metrics that reflect the performance or success of a particular third party content item such as an ad. For example, for a given content item, content delivery log 212 can maintain a record of the 'click through rate' (CTR), reflecting the percentage of users presented with a content item that click on or otherwise select the presented content, though it should be understood that any number of other performance metrics can be similarly tracked (e.g., conversion rate), as is known to those of ordinary skill in the art.

It should be noted that in situations where personal or identifying information is collected, users may be provided with the ability to control whether such information is collected, the extent to which such information is collected, and/or the extent to which a user can be identified based on it. For example, a user can select an option whereby any personal or identifying information is immediately aggregated with that of other users such that such information cannot subsequently be associated with or otherwise identify the individual user.

Additionally, content delivery system 204 can include content selection engine 206. The content selection engine 206 can select one or more third party content items, such as content items 210, such as based on various determinations computed with respect to probability rank thresholds 220, location confidence thresholds 230, and/or distance thresholds 240, as described in detail herein. It should also be understood that in some implementations content selection engine 206 can include one or more processors configured by code to implement the functionality of the content selection engine that is being described.

Figure 3:
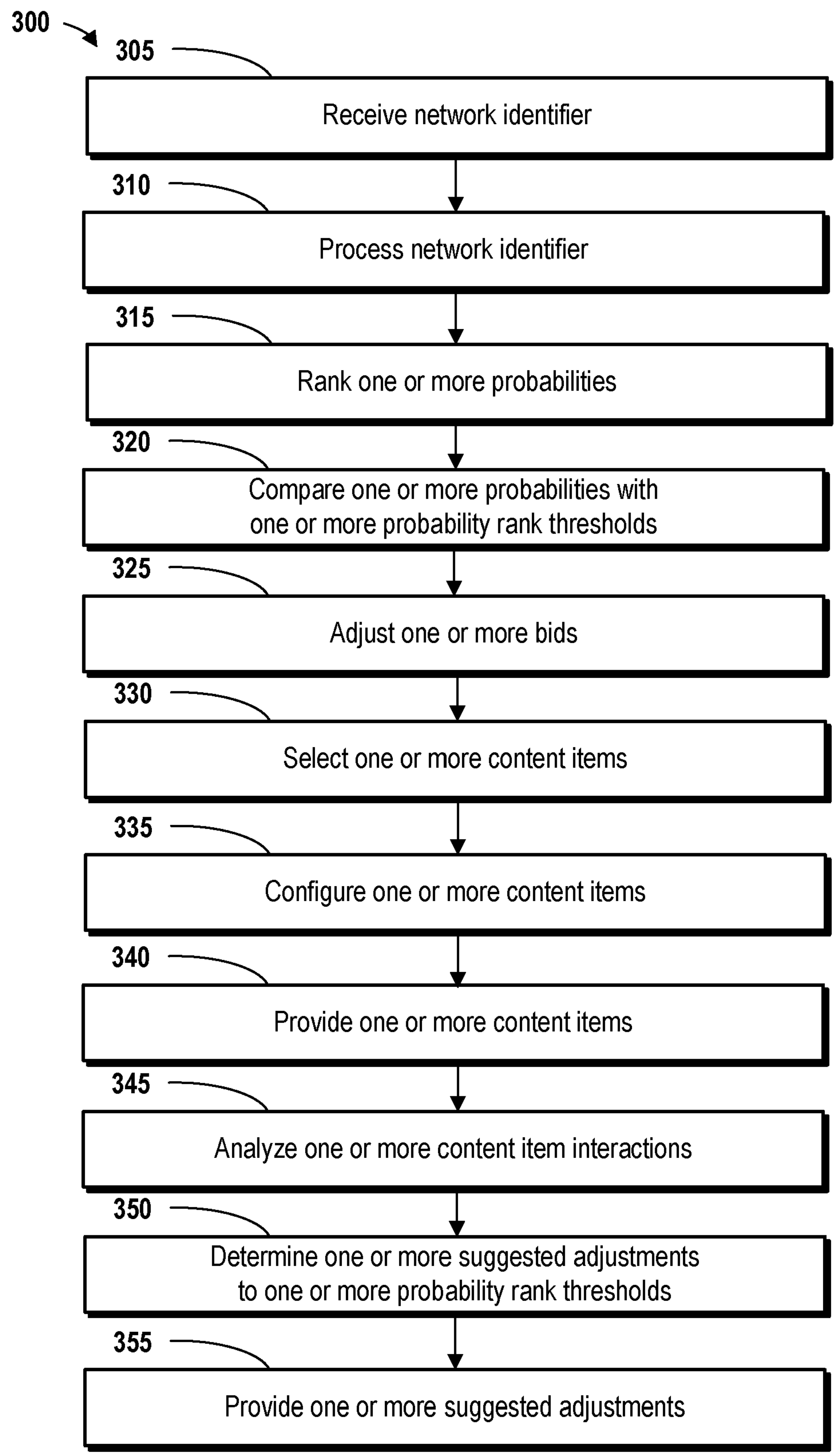
FIG. 3 is a flow chart of an example process for providing third party content.

FIG. 3 is a flowchart of an example method 300 for providing third party content. In some implementations, the method 300 can be performed by a processor executing instructions in a computer-readable storage medium. For example, the method 300 can be performed by the content delivery system 204 of FIG. 2.

Figure 4:
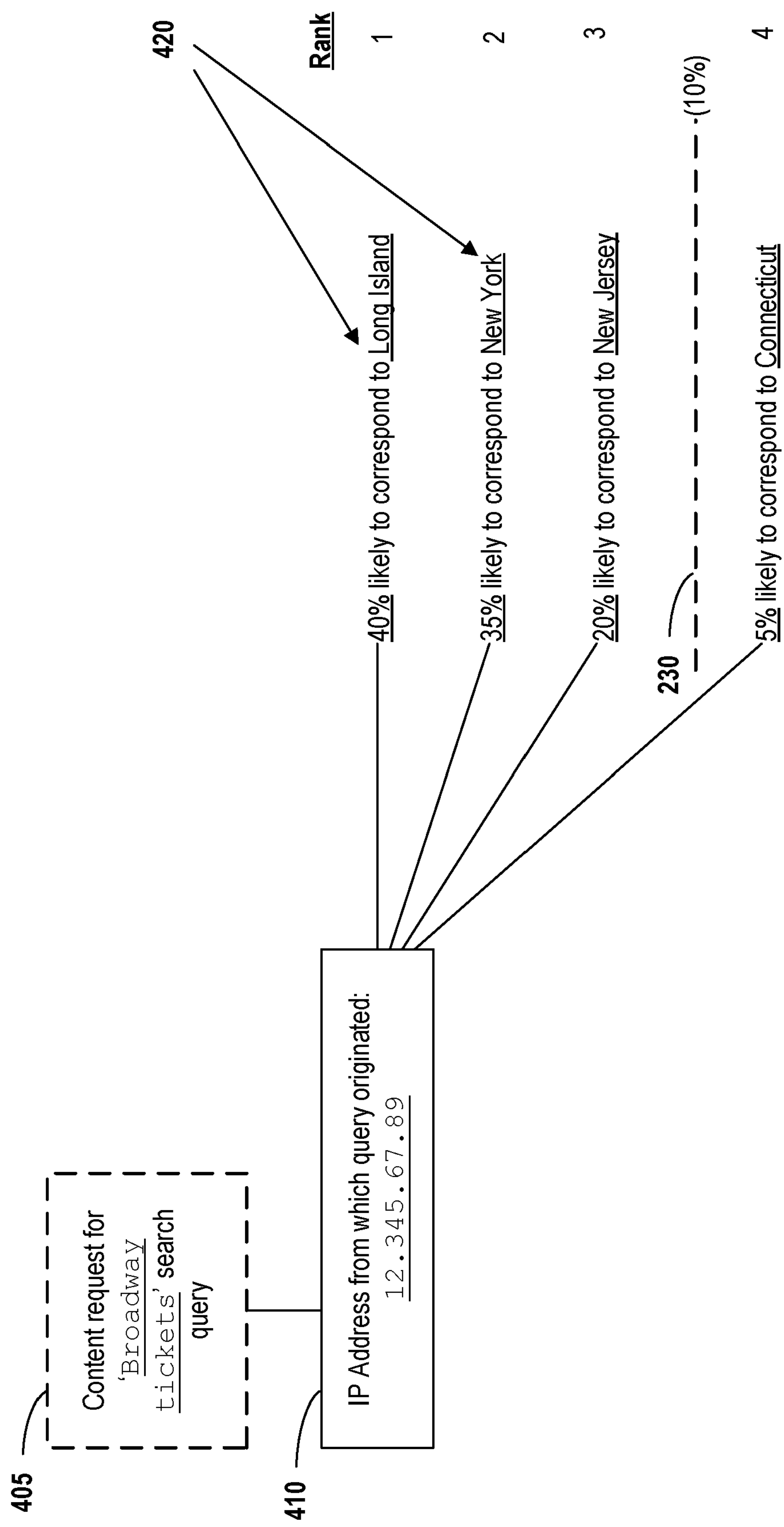
FIG. 4 depicts

A network identifier is received (305). In certain implementations, such a network identifier can be associated with a content request. For example, a content request such as a request for a content item (e.g., an advertisement) can be received from a website or 'app.' Associated with such a content request is a network identifier that corresponds to a network location such as an IP address of a device from which the referenced content request originated. For example, FIG. 4 depicts an IP address 410 ('12.345.67.89') of a device (such as user device 108A as shown in FIG. 2) from/in relation to which a particular content request 405 (e.g., a request for a content item to present in parallel with search results provided in response to the submission of the query 'Broadway tickets' into a search engine) originates.

A network identifier is processed (310). In certain implementations, a network identifier (such as the network identifier received at 305) is processed in order to determine one or more probabilities 420. Each of the probabilities can reflect a likelihood that the network location (such as the network identifier received at 305) corresponds to a respective geographic location. For example, any number of techniques can be employed to determine one or more geographic locations to which the referenced network location can correspond, as are known to those of ordinary skill in the art. Such techniques can provide varying degrees of certainty or reliability with respect to the likelihood that a network location actually corresponds to a particular geographic location (referred to herein as probabilities). By way of illustration, FIG. 4 depicts that IP address '12.345.67.89' is, for example, 40% likely to correspond to Long Island and 20% likely to correspond to New Jersey.

One or more probabilities are ranked (315). In certain implementations, each of the one or more probabilities (such as those determined at 310) can be ranked relative to one another. For example, as shown in FIG. 4, each of the probabilities determined with respect to IP address '12.345.67.89' can be ranked from highest (Long Island—40% probability) to lowest (Connecticut—5% probability).

One or more probabilities are compared with one or more probability rank thresholds (320). In certain implementations, each of the referenced probability rank thresholds can be associated with one or more content items. That is, it can be appreciated that various content providers, such as advertisers, can have differing objectives with respect to the range of geographic locations to which such content providers wish to provide content items such as advertisements. For example, one content provider may wish to focus the presentation of certain content items strictly to a particular geographic location (e.g., only to New York), while it may be advantageous for another content provider to enable presentation of content items to a broader range of geographic locations. Thus, by way of illustration, one content provider can employ a probability rank threshold with respect to a particular content item, dictating that the content item should only be presented (or should only be eligible for presentation) in response to content requests that can be determined to originate from network locations that are relatively most likely to be New York (i.e., New York is the highest ranked location probability). By way of further illustration, another content provider can employ a probability rank threshold with respect to another content item, dictating that the content item should be presented (or should only be eligible for presentation) in response to content requests that originate from network locations where New York is determined to be among the top three probable geographic locations. It can be appreciated that such a configuration is likely to increase or broaden the exposure of such content items, as, under most circumstances, substantially more content requests are likely to originate from network locations where New York among the top three probable locations as opposed to only those content requests where New York is the highest ranked location probability.

Moreover, in certain implementations, one or more of the referenced probability rank thresholds can be selected, such as based on one or more aspects of a content request (such as the content request associated with the network identifier received at 305). For example, it can be advantageous for a content provider to configure varying probability rank thresholds to be applied to various content items based on aspects of the received content request. By way of illustration, a content provider can configure a default probability rank threshold with respect to all search queries that contain the term 'Broadway tickets.' Such a default probability rank threshold can dictate that the content provider, in general, wishes for a particular content item (e.g., an content item for 'Discount Broadway Tickets—Click Here!') to be presented (or to be eligible for presentation) based on a determination that New York is among the top three probable geographic locations that correspond to the network location from which the query originated. However, such a content provider can further configure a concurrent, alternative probability rank threshold, to be applied specifically respect to the query 'same day Broadway tickets.' Such an alternative probability rank threshold can dictate that the content provider wishes for a particular content item (e.g., the same 'Discount Broadway Tickets—Click Here!' ad) to be presented (or to be eligible for presentation) based on a determination that New York is the highest ranked location probability that corresponds to the network location from which the query originated. In doing so, a content provider can account for the fact that it can be advantageous to implement different/alternative probability rank thresholds in different scenarios/circumstances (such as the receipt of different search queries).

Additionally, in certain implementations, one or more probabilities can be compared with one or more location confidence thresholds. Such a location confidence threshold can dictate, for example, a relative or absolute threshold that a particular probability (such as a probability determined at 310) must meet or exceed in order to enable the geographic location associated with the probability to be eligible with respect to providing one or more content items. In doing so, one or more of the referenced probabilities (such as those determined at 310) that meet, exceed, or fall short of the one or more location confidence thresholds can be identified. For example, as shown in FIG. 4, a location confidence threshold 230 of 10% is imposed, dictating that only those geographic locations that correspond to probabilities greater than 10% are eligible with respect to providing one or more content items. It can thus be appreciated with reference to FIG. 4 that the geographic location of Connecticut which is associated with a probability of 5% does not meet location confidence threshold 230. As such, a content item directed for presentation to users in Connecticut would not be eligible for presentation in this case (on account of not meeting/exceeding the location confidence threshold). By way of further illustration, a relative location confidence threshold can be imposed, dictating, for example that only the geographic locations that correspond to the three highest ranked probabilities are eligible.

It should be noted that while many of the examples and illustrations provided herein describe various features, functionalities, aspects, etc., with respect to particular content items such as ads (such as a probability rank threshold associated with a particular ad), such implementations are merely exemplary and are described as such in the interests of simplicity and clarity. However, it should be understood that in other implementations the referenced features, functionalities, aspects, etc., can be employed with respect to any number of content items. For example, a content provider can associate a probability rank threshold across an entire ad campaign (or multiple ad campaigns) that includes any number of ads. Additionally, while many of the geographic locations referenced herein are illustrated with respect to cities, states, and/or metropolitan areas, it should be understood that any number of other methods of geographic reference (e.g., zip codes) are similarly contemplated.

One or more bids are adjusted (325). Such bids can correspond to bids provided in a content presentation auction, such as on behalf of a content provider (such as an advertiser) and/or in relation to one or more content items (such as ads). That is, as described herein, auctions can be conducted, and bids can be received from/on behalf of various content providers for the ability to provide content item(s) in response to content requests (such as the content request referenced at 305, such as a request for one or more advertisements). Accordingly, it can be advantageous under certain circumstances for such bids to be adjusted or modified by/on behalf of such content providers. For example, in certain implementations, the referenced bids can be adjusted based on a comparison of one or more probabilities with the one or more location confidence thresholds. By way of illustration, for a content provider wishing to provide content that is primarily focused towards users located on Long Island, a location confidence threshold can be implemented, dictating that in a scenario where a probability of a network location from which a content request originates (such as a probability determined at 310) is determined to be greater than 50% likely to be Long Island (thus indicating, for example, a higher than usual degree of certainty), a bid provided in an auction for the opportunity to provide content in response to such a content request can be increased. For example, a bid 'multiplier' that can increase the default value of a bid provided in such an auction (for example, doubling the maximum bid amount) can be employed. Accordingly, in such a scenario, under 'normal' circumstances, such as where a probability of a network location from which a content request originates is less than 50% likely to be Long Island (e.g., 35% likely to be Long Island), a default bid amount can be provided, while in circumstances where it is more than 50% likely that the network location corresponds to Long Island, the default bid amount can be increased (by a fixed or relative amount), thus reflecting this increased degree of certainty and the additional value that such certainty has for the content provider. By way of further illustration, such adjustments can be similarly employed to lower a default bid amount. For example, a location confidence threshold can be implemented, dictating that in a scenario where a probability of a network location from which a content request originates (such as a probability determined at 310) is determined to be less than 30% likely to be Long Island (thus indicating, for example, a relatively low relative degree of likelihood that the content request actually originated from Long Island), a bid provided in an auction for the opportunity to provide content in response to such a content request can be reduced, such as by employing, for example, a bid 'multiplier' that can decrease the default value of a bid provided in such an auction (e.g., reducing the maximum bid amount by half), reflecting this lesser degree of certainty. It should also be noted that the illustrated location confidence thresholds are merely exemplary and any number of additional and/or alternative implementations are similarly contemplated (e.g., reducing a default bid amount in a scenario where the probability that the network location from which a content request originates corresponds to a particular location meets/exceeds a defined location confidence threshold).

One or more content items are selected (330). In certain implementations, such content items (such as ads) can be selected based on a comparison of one or more probabilities with one or more probability rank thresholds (such as the comparison at 320). That is, having compared any number of respective probability rank thresholds (each of which is associated with one or more content items such as ads) with various probabilities (each of which reflects a likelihood that the network location associated with a content request corresponds to a respective geographic location), the content item (or content items) associated with a probability rank threshold that is compatible/consistent with one or more of the probabilities associated with a particular content request can be selected. For example, with respect to the probabilities depicted in FIG. 4 in relation to a content request originating from the IP address '12.345.67.89,' it can be appreciated that such probabilities are compatible/consistent with a probability rank threshold dictating that a content item should be presented (or should only be eligible for presentation) in relation to network locations where New York is determined to be among the top three probable geographic locations. It can be similarly appreciated that the probabilities depicted in FIG. 4 are not compatible/consistent with a probability rank threshold dictating that a content item should be presented (or should only be eligible for presentation) in relation to network locations where New York is the highest ranked location probability. It should also be noted that, in certain implementations, the referenced content items can be selected based on the outcome of a content presentation auction (in addition to based on the referenced comparison of the determined probabilities with one or more probability rank thresholds). In such implementations, such an auction can be conducted, for example, among the various content items associated with respective probability rank thresholds determined to be consistent with the various probabilities determined based on the network location associated with a content request with respect to which the auction is conducted.

Figures 5A, 5B:
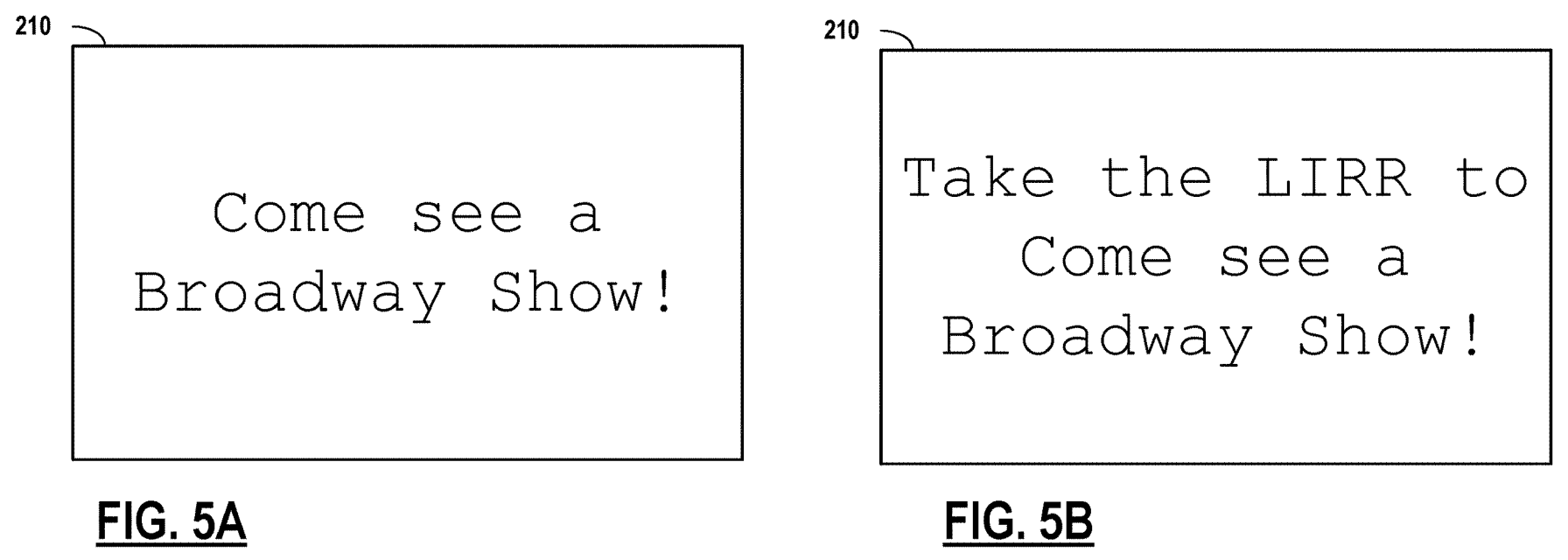

One or more content items are configured (335). In certain implementations, the referenced content items can be configured based on one or more of the referenced probabilities (such as those determined at 310). For example, the substance or content of the content item itself (such as the text of the ad in the case of a text ad) can be modified or adjusted based on various determined probabilities which reflect varying degrees of likelihood that the network location from which a content request was received corresponds to one or more respective geographic locations. By way of illustration, in certain implementations, the referenced content items (such as those selected at 335) can be adjusted in relation to a geographic location, such as the geographic location having the highest rank (as described at 315) and/or meeting/exceeding a location confidence threshold (e.g., greater than 50% likelihood). FIG. 5A depicts an exemplary text content item 210 ('Come see a Broadway Show!') that can be adjusted by supplementing the original text with additional location-specific content ('Take the LIRR to Come see a Broadway Show!,' as shown in FIG. 5B), such as in a scenario where Long Island is determined to be the geographic location having the highest rank and/or in a scenario where the determined probability for Long Island meets/exceeds a location confidence threshold (e.g. 50%). In doing so, a content item that is otherwise applicable to a wider range of locations can be configured to be directed towards a particular location that is more likely to be the geographic location from which the content request originated.

One or more content items are provided (340). In certain implementations, the referenced content items (such as those selected at 330 and/or configured at 335) can be provided to a device (such as the device from which the network identifier received at 305 originated, such as user device 108A). For example, a selected content item, such as an ad, can be provided within a webpage or an app, such as in a manner known to those of ordinary skill in the art.

One or more content item interactions are analyzed (345). For example, historical data (such as that stored in content delivery log 212) reflecting, for example, various aspects of previous interactions occurring with respect to various content items (for example, click through rates, conversion rates, etc.) can be analyzed. In certain implementations, such content item interactions can be analyzed in relation to the respective geographic locations with respect to which they occur. In doing so, one or more geographic locations, such as a geographic location associated with a content item interaction, can be identified. By way of illustration, click through rates and/or conversion rates of one or more content items (such as ads) can be analyzed to identify the various geographic locations in relation to which such rates are highest. For example, FIG. 6 depicts several exemplary click through rates for a particular content item (content item 210), sorted from highest to lowest with respect to the respective geographic locations from which such interactions originated.

One or more suggested adjustments to the one or more probability rank thresholds can be determined (350). In certain implementations, the referenced adjustments can be determined based on one or more geographic locations, such as geographic locations associated with content item interaction(s) (such as those identified at 345). Moreover, in certain implementations the probability rank thresholds (in relation to which the referenced suggested adjustments are determined) are associated with one or more content items. For example, having identified (such as at 345) that one or more geographic locations (e.g., Connecticut and New Jersey, as shown in FIG. 6) have historically been associated with relatively high click through rates with respect to a particular content item (content item 210), if the probability rank threshold currently associated with the content item is not consistent/compatible with such results (e.g., a probability rank threshold dictating that the content item is to be presented only in response to content requests that originate from network locations where New York is the highest ranked location probability), a suggested adjustment, accounting for such a disparity, can be determined. In this case, a suggested adjustment to the probability rank threshold can be generated, such as an adjustment to the probability rank threshold to dictate that the content item should be presented (or should only be eligible for presentation) in response to content requests that originate from network locations where New York is determined to be among the top three probable geographic locations. In doing so, such a content item can be exposed to a broader range of content requests, such as those potentially originating from Connecticut and New Jersey (areas which have historically been shown to perform well with respect to the particular content item).

Figure 7:
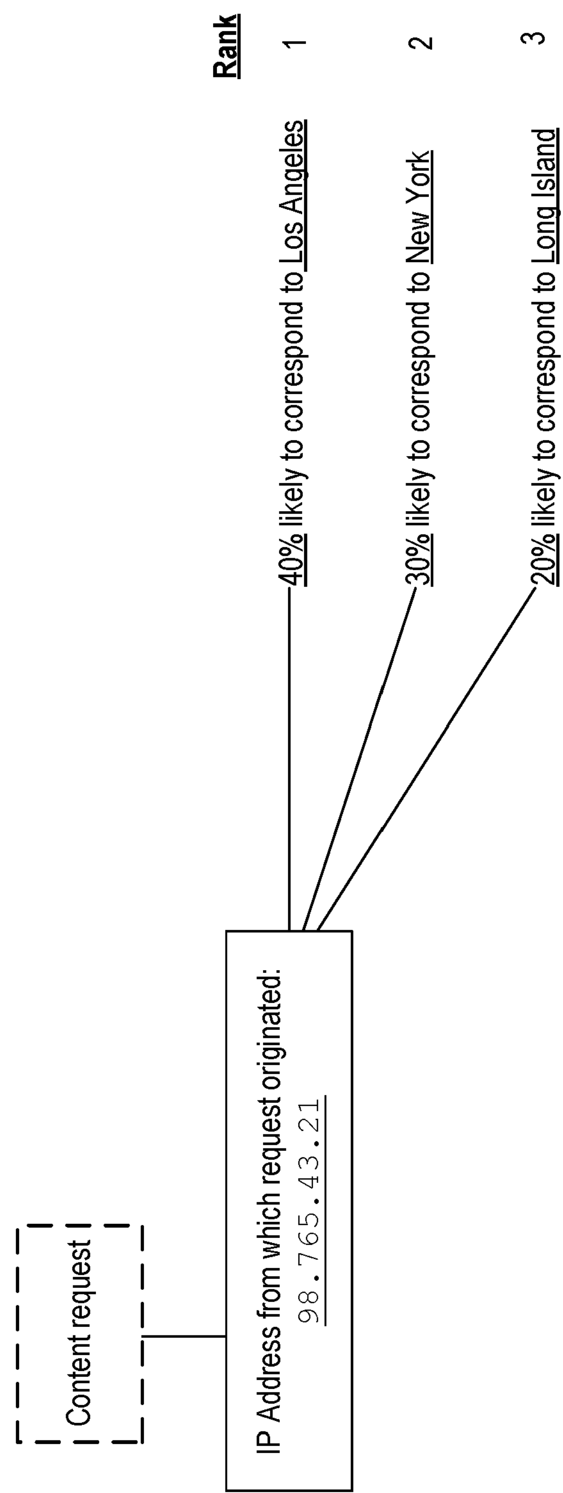
FIG. 7 depicts another exemplary IP address from which a content request originates.

Moreover, in certain implementations a distance threshold can be applied, such as in relation to the respective geographic locations that correspond to one or more probabilities (such as the probabilities determined at 310). Such a distance threshold can, for example, reflect a distance from a geographic location that corresponds to a highest ranked probability. That is, it can be appreciated that, under certain circumstances, one or more of the probabilities determined with respect to a network location from which a content request originates may correspond to a geographic location that is significantly geographically disparate from the geographic area with respect to which a particular content item is intended to be provided. For example, FIG. 7 depicts a content request originating from IP address '98.765.43.21' which is, for example, 40% likely to correspond to Los Angeles and 30% likely to correspond to New York. It can be appreciated that while a probability rank threshold such as has been described herein which dictates that a content item should be presented (or should be eligible for presentation) in relation to network locations where New York is determined to be among the top three probable geographic locations, applying such a probability rank threshold in this scenario would result in the associated content item being presented despite the fact that it is (relatively) most likely that the content request originated from a geographic location that is considerably distant from New York (i.e., Los Angeles). Accordingly, a suggested adjustment reflecting a distance threshold can be generated and/or provided. Such a distance threshold can dictate that an associated content item only be provided in response to a content request originating from a network location with respect to which the highest ranked probability corresponds to a geographic location that is within a defined distance/radius from a particular geographic location. Thus, continuing with the above example, in addition to the referenced probability rank threshold (dictating that the content item is eligible for presentation where New York is among the top three probable geographic locations), a distance threshold can also be employed, dictating that the highest ranked probability (even if not New York) must still be within a defined distance (e.g., 50 miles) of New York in order for the content item to be eligible for presentation in response to a content request originating from such a network location. Accordingly, in the scenario depicted in FIG. 7 (where Los Angeles is the highest ranked probability), the referenced content item would not be eligible for presentation, despite the fact that New York is within the referenced probability rank threshold. It can be appreciated that determining/employing suggested adjustments such as this can enable a content provider to both provide content exposure to a broader range of locations while also ensuring that network locations that may have a significant likelihood of being far outside the location range that is of value/significance to the content provider can be avoided.

One or more suggested adjustments are provided (355). In certain implementations, the referenced suggested adjustments (such as those determined at 350) can be provided to a content provider, such as a content provider associated with one or more content items associated with the probability rank thresholds in relation to which the suggested adjustments are provided. For example, one or more notifications, recommendations, instructions, etc., reflecting such suggested adjustments can be provided to such content providers. Moreover, in certain implementations such adjustments can be configured for implementation in an automated fashion, thereby avoiding the need for manual input/approval on the part of the content provider.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 8:
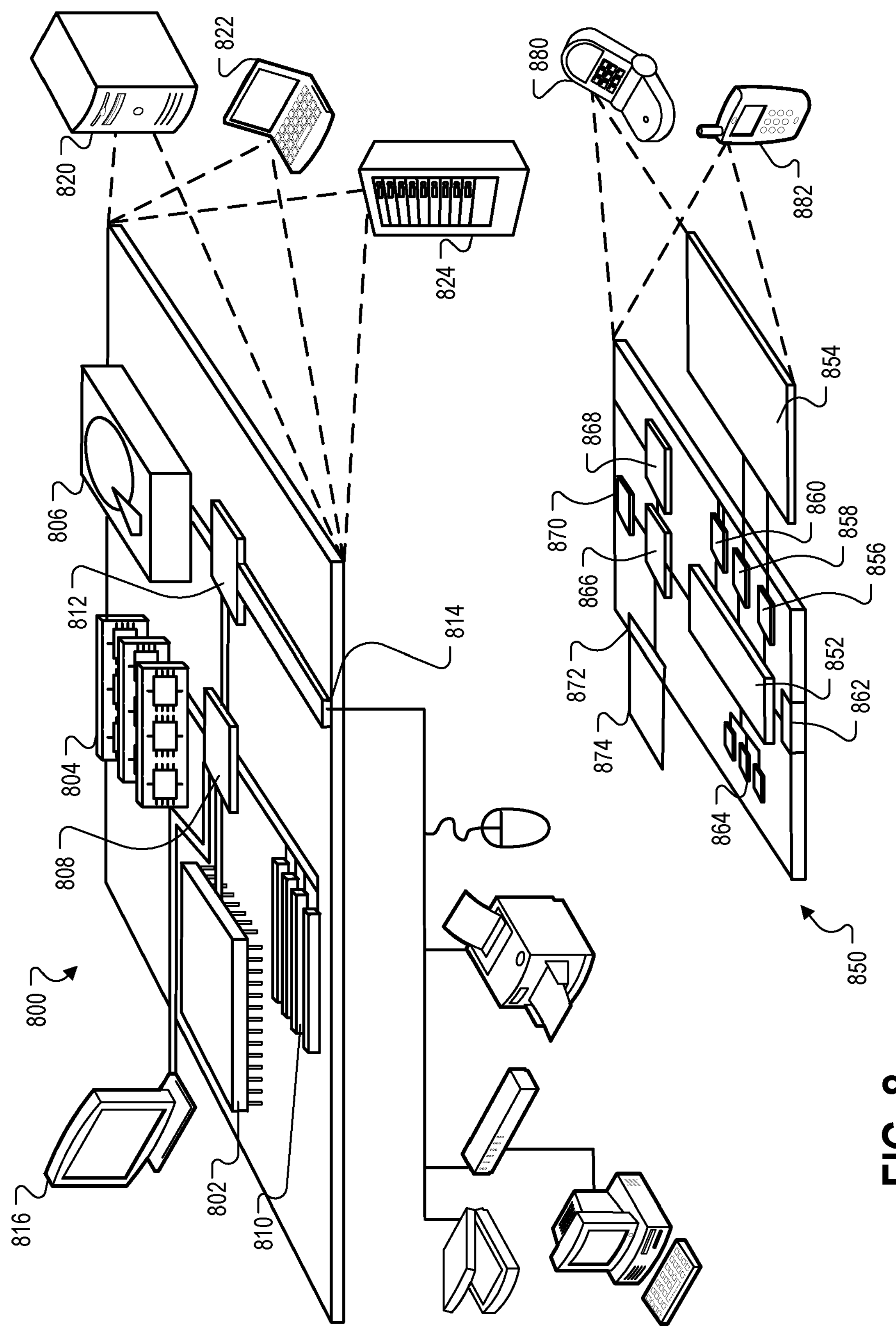
FIG. 8 shows an example of a computing device and a mobile computing device that can be used in connection with computer-implemented methods and systems described in the present specification.

FIG. 8 shows an example of a computing device 800 and a mobile computing device that can be used to implement the techniques described in the present specification. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the subject matter described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, e.g., a computer-readable storage medium such as a floppy disk device, a hard disk device, an optical disk device, or a tape device, a flash memory or other similar solid state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provided as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method to select content, comprising:

receiving, by a content management system server, a content request comprising a network identifier, the network identifier indicating a network location of a client computing device from which the content request originated;

determining, by the content management system server, based on the network identifier, one or more location probabilities that indicate a likelihood that the network location corresponds to a respective geographic location of the client computing device;

receiving, by the content management system server from a third-party content provider, a third-party content item for presentation at the client computing device;

determining that the one or more location probabilities differ from a location confidence threshold associated with a default bid amount; and automatically adjusting, by the content management system server, the default bid amount based on the one or more location probabilities differing from the location confidence threshold.

2. The method of claim 1, wherein automatically adjusting the default bid amount includes increasing the default bid amount for a certain geographic location by a fixed amount in response to determining that the location probability for the certain geographic location exceeds the location confidence threshold.

3. The method of claim 1, wherein automatically adjusting the default bid amount includes increasing the default bid amount for a certain geographic location by a relative amount in response to determining that the location probability for the certain geographic location exceeds the location confidence threshold.

4. The method of claim 1, wherein automatically adjusting the default bid amount includes lowering the default bid amount for a certain geographic location by a fixed amount in response to determining that the location probability for the certain geographic location is lower than the location confidence threshold.

5. The method of claim 1, wherein automatically adjusting the default bid amount includes lowering the default bid amount for a certain geographic location by a relative amount in response to determining that the location probability for the certain geographic location is lower than the location confidence threshold.

6. The method of claim 1, wherein receiving the network identifier includes determining an Internet Protocol (IP) address associated with the content request.

7. The method of claim 1, further comprising:

using the adjusted bid amount in a content presentation auction.

8. A method to select content, comprising:

receiving, by a content management system server, a content request comprising a network identifier, the network identifier indicating a network location of a client computing device from which the content request originated;

determining, by the content management system server, based on the network identifier, one or more location probabilities that indicate a likelihood that the network location corresponds to a respective geographic location of the client computing device;

receiving, by the content management system server from a third-party content provider, a modifiable third-party content item for presentation at the client computing device, the modifiable third-party content item related to a geographic location;

determining, by the content management system server, that a location probability, of the one or more location probabilities, corresponding to the geographic location exceeds a threshold value; and in response to determining that the location probability exceeds the threshold value:

prior to the modifiable third-party content item being provided to the client computing device, adjusting the modifiable third-party content item to include additional information related to the geographic location, and providing the modifiable third-party content item that was adjusted to the client computing device for presentation via the client computing device.

9. The method of claim 8, wherein adjusting the modifiable third-party content includes:

supplementing an original text of the third-party content item with additional content specific to the geographic location.

10. The method of claim 8, further comprising:

applying a distance threshold in relation to the respective geographic location of the client computing device.

11. The method of claim 10, wherein the distance threshold comprises a distance from a geographic location that corresponds to a highest ranked location probability.

12. The method of claim 8, further comprising:

selecting the threshold value based on one or more aspects of the content request.

13. A system to select content, comprising a content management system server comprising one or more processors coupled to memory, the content management system server configured to:

receive a content request comprising a network identifier, the network identifier indicating a network location of a client computing device from which the content request originated;

determine, based on the network identifier, one or more location probabilities that indicate a likelihood that the network location corresponds to a respective geographic location of the client computing device;

receive, from a third-party content provider, a third-party content item for presentation at the client computing device; and automatically adjusting, based on the one or more location probabilities differing from a location confidence threshold, at least one of (i) a default bid amount associated with the presentation of the third-party content item, the location confidence threshold associated with the default bid amount, or (ii) prior to the third-party content item being provided to the client computing device, the third-party content item to include additional information related to the geographic location.

14. The system of claim 13, wherein the content management system server is further configured to:

adjust the default bid amount by increasing the default bid amount for a certain geographic location by a fixed or relative amount in response to determining that the location probability for the certain geographic location exceeds the location confidence threshold.

15. The system of claim 13, wherein the content management system server is further configured to:

adjust the default bid amount by lowering the default bid amount for a certain geographic location by a fixed or relative amount in response to determining that the location probability for the certain geographic location is lower than the location confidence threshold.

16. The system of claim 13, wherein the content management system server is further configured to:

supplement an original text of the third-party content item with additional content specific to the geographic location.

17. The system of claim 13, wherein the content management system server is further configured to:

apply a distance threshold in relation to the respective geographic location of the client computing device.

18. The system of claim 13, wherein the distance threshold comprises a distance from a geographic location that corresponds to a highest ranked location probability.

19. The system of claim 13, wherein the content management system server is further configured to:

determine an Internet Protocol (IP) address associated with the content request.

* * * * *